J. HOLLINGSWORTH.
Grain-Decorticators.

No. 147,132. Patented Feb. 3, 1874.

Witnesses
D. P. Cowl
Edmund Masson

Inventor:
John Hollingsworth.
By atty. A. B. Stoughton.

UNITED STATES PATENT OFFICE.

JEHU HOLLINGSWORTH, OF NEW YORK, N. Y.

IMPROVEMENT IN GRAIN-DECORTICATORS.

Specification forming part of Letters Patent No. 147,132, dated February 3, 1874; application filed April 22, 1873.

*To all whom it may concern:*

Be it known that I, JEHU HOLLINGSWORTH, of the city, county, and State of New York, have invented certain new and useful Improvements in Apparatus for Treating and Preparing Grain for Grinding; and that the following is a full, clear, and exact description of the same, reference being had to the accompanying drawings making a part of this specification, in which—

Figure 1:
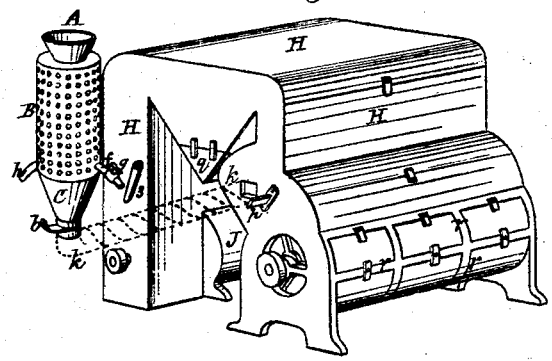
Figure 2:
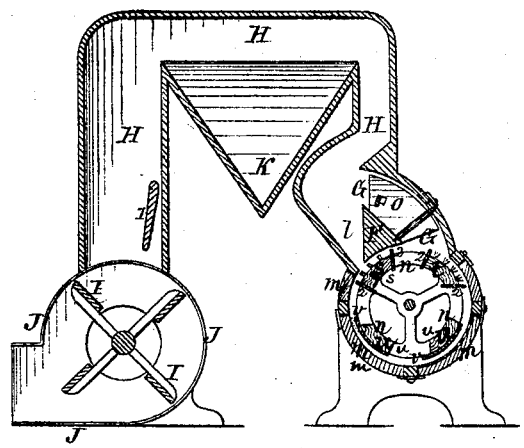
Figure 3:
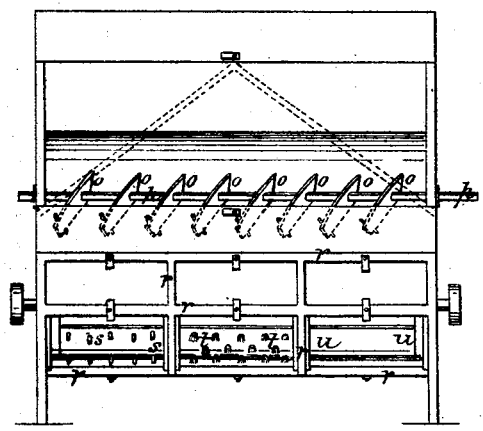
Figure 4:
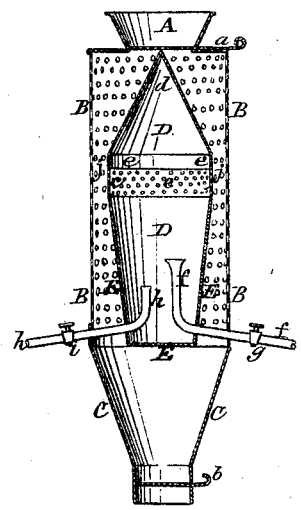
Figure 5:
Figure 6:
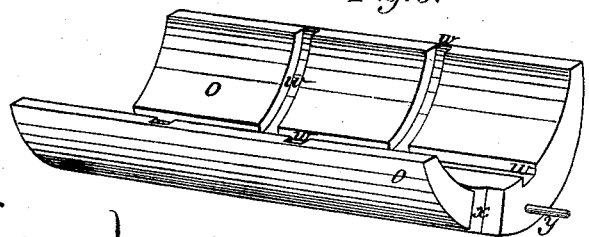

Figure 1 represents, in perspective, the steaming and decorticating apparatus as connected, so as to make one continuous operation. Fig. 2 represents a vertical transverse section through the decorticating-machine. Fig. 3 represents a front view of the decorticating-machine, with the doors, flaps, or casings removed, to show the interior thereof. Fig. 4 represents, on an enlarged scale, a vertical section through the steaming apparatus. Fig. 5 represents, separately, some of the sections or panels which compose the concave of the decorticator. Fig. 6 represents, in perspective, a steam-jacket, which, under certain circumstances of the grain to be treated, may be used in connection with, or as a substitute for, the concave in the decorticator, as will be explained.

Similar letters of reference, where they occur in the several separate figures, denote like parts of the apparatus in all of the drawings.

Wheat, as at present transported to market—particularly that transported by sea—is liable to be injured for flour-making from dampness, tainting by bilge-water, must, mold, minute insects, or their ova, all of which adhere to the outer woody cuticle of the berry, and which outer cuticle, if carefully removed, carries with it all these adhering impurities, leaving the starch and gluten pure, clean, and disinfected, and greatly increasing the quantity and quality of the flour, when the so cleaned, hulled, and disinfected berries are ground.

The object and purpose of my invention are to remove the woody cuticle from grain, and to separate it entirely therefrom, without damage to the gluten and starch which constitutes the inner portion thereof, by which a clean, pure, and very white flour is produced, and the quantity of flour increased; and, first premising that the use of steam has been essayed for loosening the bran or outer cuticle of grain, and which I do not claim to have discovered, my invention consists in certain apparatus for accomplishing this purpose, by which, without danger or injury to the inner part of the berry, the hull, bran, or woody portion is first loosened up, then by attrition detached, and finally separated and carried off.

To enable others skilled in the art to make and use my invention, I will proceed to describe the same with reference to the drawings.

The grain to be divested of its woody cuticle and the adhering impurities is first introduced through the hopper A into and through a steaming apparatus constructed as follows: The outer and cylindrical portion B of the steaming apparatus is perforated with holes, as seen in the drawings, and its lower portion, C, is made conical. The top or upper portion of this case is controlled by a slide, $a$, and under portion by a slide, $b$, which two slides, in a great degree, regulate the quantity of grain admitted and passed through the cylinder by controlling its inlet and exit. In the interior of this outer cylinder or case there is an inclosed steam-chamber, D, with minute issues or perforations through it, as at $c$. This interior chamber, D, has first a conical top, $d$, then a central cylindrical portion, $e$, where the perforated belt $c$ is placed, and the lower portion E is in the form of a frustum of an inverted cone. From the exterior of the outer cylinder or case a steam-pipe, $f$, leading from a steam-boiler, enters and passes into the interior of the inner or steam chamber D to convey steam therein, which steam-pipe should have a cock or valve, $g$, in it to regulate the quantity of steam to be admitted, or to shut it off when necessary; and from the interior of said chamber D a pipe, $h$, extends to the exterior, having also a cock or valve, $i$, in it to carry off the water of condensation from the steam-cylinder. Between the inner steam-chamber and the jacket of the outer cylinder there is an annular space of varied area for a purpose that will be explained.

The upper part $d$ of the interior steam-chamber is conical, so as to spread the incoming grain evenly and into a thin sheet; and it is solid—that is, not perforated—so that, by becoming heated by the steam on the inner side, it may impart its heat to the grain moving over it, and, by so partially heating or warming the grain, make it less liable to the condensation of the steam upon it, which would too much dampen it. At the point $j$ the annular space between the outer perforated cylinder and the inner steam-chamber is most contracted, and at this contracted part the perforations $c$ in the steam-chamber are located so that the jets of the high and comparatively dry steam may drive through the thin sheet of passing grain and blister, without too much dampening or scalding, the berry. The steam after passing through the perforated belt $c$, and through the thin sheet of grain passing these perforations, immediately drives through the perforations of the outer case B, so that the grain is only momentarily subjected to this passing steam, but long enough to have its outer hull blistered and loosened from the interior and slightly moistened by condensation, so as to be afterward easily rubbed off, without unnecessary dampening or scalding of the interior. From the point or part $j$ the annular space widens out to the bottom of the steam-chamber, or thereabout, to allow the swollen or enlarged grains to freely pass through, and into and through, the bottom portion $c$ of said outer case.

From the bottom of the steaming apparatus, as hereinabove described, a conveyer of any ordinary well-known construction, as at $k$, Fig. 1, or a spout, may extend to and connect with the decorticator and separator, where the hull is detached and separated from the berry and carried off.

The grain, after being blistered by the film of steam driving through it at its thinnest or most contracted point, and having been conveyed into the machine where the blistered and partially-loosened outer woody cuticle is to be entirely removed and separated from the clean, pure, white berry, is dropped into a hopper-shaped space, $l$, Fig. 2, whence it falls between a concave, $m$, and a revolving cylinder, $n$, both of which may be furnished with rubbing-surfaces, as will be explained, for rubbing off the blistered and partially-loosened and slightly-moistened outer hulls of the grain. Over the cylinder $n$ there is a triangular-shaped throat-piece, F, which separates the hopper-shaped space $l$ from a passage, G, up through which the grain is thrown by the rotation of the cylinder $n$, to be again returned as often as necessary through the space $l$, to be again acted upon by the cylinder and concave $n$ $m$. In the passage G are arranged a series of vanes or guides, $o$, pivoted or hinged at one end, and all connected with a rod $p$ at their other ends, so that from the exterior of the machine these vanes or guides may be so inclined as to retard or hurry the grain through the machine, as its condition may require, and bring it quicker or less quickly to that end of the machine where it drops out at $x$, Fig. 5, completely hulled. As the outer cuticle is rubbed off from the berry, it, as well as the grain, is thrown up into the passage G, and this passage G connects with a wind trunk or passage, H, leading to a suction-fan, I, so that all the light material, separated or detached from the grain, is carried by this suction-blast over to and out of the fan-case J. Should any of the grains be carried over by the suction-blast they will drop into the receptacle K where the blast is expanded, and cannot, owing to their specific gravity, carry them any any farther; and this receptacle is emptied through a door at $q$, Fig. 1.

The concave $m$ may have interchangeable sections or panels, as shown at L M N, Fig. 5, furnished with wire-meshing, bristles, or vulcanized rubber, or a composition of rubber, emery, glue, and any earthy matter, and all alike or of varied substances, as may be found most desirable. These sections or panels may be fitted to a skeleton frame, $r$, so as to be easily removed, changed, or replaced, at pleasure, or interchanged.

The cylinder or beater $n$ is partially covered and partially open, and by its rotation not only becomes a beater or rubbing instrument, but creates a blast that aids in throwing up the grain into the passage G. The cylinder or beater $n$ may have sections furnished with nails, as at $s$, or bristles, or wire-brushes, as at $t$, or with vulcanized rubber, as at $u$, and, instead of there being several sections in the length of the cylinder or beater, they may be in one section and uniformly clothed with a roughened or rubbing-surface, such as described. In Fig. 2 I have shown two of the longitudinal ribs, which have rubber flaps, $v$, extending beyond their edges, so that, by the centrifugal force, these flaps may be thrown against the rubbing surfaces on the concave, and so roll and rub the grains to divest them of their blistered and partially-loosened hulls without breaking the berry; and upon two others I have shown metal plates, as at 2, extending beyond the ribs themselves, so as to act both as vanes for creating a blast, as well as to take and carry the grain bodily around and throw it up into the passage G, as before described; and these plates may be covered with vulcanized rubber.

As a general thing, in steaming and decorticating grain, as hereinabove described, the grain may pass immediately from the decorticator to the stones, and be ground into flour; but it may, and sometimes does, happen that the wheat becomes dampened in transporting it; or, the steaming process may result in dampening the grain too much for immediate grinding, or both casualties combine to so dampen the grain too much for being ground at once after being hulled or divested of its outer cuticle; and to provide against such an occurrence I make and use with a decorticating-machine a steam-concave, as seen at O, which may have recesses $w$ formed in its concave surface, so as to take in the skeleton-frame to which the concave is attached and by which it is held, and an opening, $x$, in or through it, for the grain to pass through when completely finished or treated. Steam-pipes $y$ are also connected with this steam-concave, so that it may be suitably heated to dry the grain as it is passed along over it in having the hulls rubbed off.

In extensive milling or grinding it is most economical to have two or more of these steaming and decorticating machines arranged for use, one of which may have a concave, such as is shown in Fig. 2, and another such a concave, as is shown Fig. 6, which would save the time lost in changing the concaves to suit the wheat or grain as it happens to run dry or wet, as described.

In the wind trunk or passage H there is a valve, 1, which, through a rod or handle, 3, on the exterior, can be used for regulating the force of the blast.

The cylinder $n$, even where the spikes, nails, or wires are used, may be covered with vulcanized rubber, as well as the portions at $u$; and the concave may also be so covered with rubber, as I find, in practice, that such rubber surfaces, while yielding enough not to damage the grains by breaking them, holds them sufficiently hard to rub off the hulls; besides, the vulcanized rubber is not injured by the heat or moisture coming in contact with it, and is very durable. The rubber surface may be used with the concave O, Fig. 6, when that concave is used, instead of the one, $m$, above described.

The mode of steaming the grain preparatory to its being divested of its outer hull or cuticle, constitutes no part of my present invention or application, having obtained Letters Patent therefor on the 24th September, 1872, No. 131,682. I have simply described and shown the steaming apparatus in connection with my decorticating-machine, so as to give a clear idea of the continued operation of steaming and hulling the grain; but I claim only in this application the machine for decorticating and drying the grain, should it happen to be too moist. I am aware that rubbing-cylinders have been covered with india-rubber; this, therefore, I do not claim substantially.

Having thus fully described my invention, what I claim therein as new, and desire to secure by Letters Patent, is—

1. In a machine for decorticating steamed, blistered, or moistened grain, the combination of the revolving cylinder, stationary concave, and interchangeable plates, having coverings of vulcanized rubber, substantially as and for the purpose described.

2. In a machine for decorticating steamed, blistered, or moistened grain, the combination of the cylinder, concave, air-trunk, adjustable-grinding vanes or boards, and suction-fan, arranged to operate together, as and for the purpose described and represented.

3. In combination with a decorticating-machine, for rubbing off the hulls from steamed, blistered, or moistened wheat, or other grain, the removable and hollow concave O, forming a receptacle for steam for drying the grain when dampened, as herein described and represented.

JEHU HOLLINGSWORTH.

Witnesses:
S. A. GINNA,
CHAS. W. WICKHAM.